United States Patent
Pasquali et al.

(10) Patent No.: US 11,985,193 B2
(45) Date of Patent: May 14, 2024

(54) PROCESSING SIGNALS FROM A SENSOR GROUP

(71) Applicant: EcoSteer Srl, Bolzano (IT)

(72) Inventors: Elena Pasquali, Bolzano (IT); Daniele Grazioli, Bolzano (IT)

(73) Assignee: EcoSteer Srl, Florence (IT)

( * ) Notice: Subject to any disclaimer, the term of this patent is extended or adjusted under 35 U.S.C. 154(b) by 0 days.

(21) Appl. No.: 17/140,828

(22) Filed: Jan. 4, 2021

(65) Prior Publication Data

US 2021/0234926 A1    Jul. 29, 2021

Related U.S. Application Data

(63) Continuation of application No. 15/357,717, filed on Nov. 21, 2016, now Pat. No. 10,887,395.

(51) Int. Cl.
| | | |
|---|---|---|
| *G06F 15/173* | (2006.01) | |
| *H04L 43/022* | (2022.01) | |
| *H04L 43/0811* | (2022.01) | |
| *H04L 43/16* | (2022.01) | |
| *H04L 67/12* | (2022.01) | |

(52) U.S. Cl.
CPC ............ *H04L 67/12* (2013.01); *H04L 43/022* (2013.01); *H04L 43/0811* (2013.01); *H04L 43/16* (2013.01)

(58) Field of Classification Search
CPC ... H04L 67/12; H04L 43/022; H04L 43/0811; H04L 43/16
USPC .................... 709/204, 250; 370/521; 725/39; 711/117, 118, 133
See application file for complete search history.

(56) References Cited

U.S. PATENT DOCUMENTS

| | | | |
|---|---|---|---|
| 6,118,763 A | 9/2000 | Trumbull | |
| 6,556,640 B1 * | 4/2003 | Baba ..................... | H04L 7/0338 370/518 |
| 7,617,313 B1 | 11/2009 | Washburn et al. | |
| 7,633,944 B1 | 12/2009 | Chang et al. | |
| 7,684,524 B2 * | 3/2010 | Haim ..................... | H03G 3/001 375/345 |
| 8,122,473 B2 * | 2/2012 | Song ..................... | H04H 60/73 725/62 |

(Continued)

*Primary Examiner* — Thuong Nguyen
(74) *Attorney, Agent, or Firm* — Sterne, Kessler, Goldstein & Fox P.L.L.C.

(57) ABSTRACT

Embodiments disclosed herein for processing signals from sensor groups include processor(s) configured to perform operations comprising sampling, at a configurable signal sampling interval, a plurality of signal sample values via the one or more output signal traces from the plurality of remotely located sensors; storing, in a transmission array, an available portion of parameters extracted from a first timeslot array and from a second timeslot array, wherein the available portion of parameters is extracted using an algorithm configured to assign specific parameters to the transmission array, independent of the sampling; and transmitting, to an external communications network, an available portion of the parameters stored in the transmission array, at a transmission interval, wherein the transmission interval is independent of timeslot durations of the first timeslot array and the second timeslot array, and wherein the transmitting operation is performed independently of the storing operation of the available portion of parameters.

20 Claims, 6 Drawing Sheets

(56) References Cited

U.S. PATENT DOCUMENTS

| | | | |
|---|---|---|---|
| 8,185,355 B2* | 5/2012 | Nath | H04Q 9/00 702/176 |
| 8,990,915 B2 | 3/2015 | Emmons et al. | |
| 10,887,395 B2* | 1/2021 | Pasquali | H04L 43/16 |
| 2003/0007549 A1* | 1/2003 | Kada | H04L 25/14 375/219 |
| 2004/0024915 A1* | 2/2004 | Abe | H04L 9/40 382/128 |
| 2004/0125896 A1* | 7/2004 | Lee | H04L 27/2647 375/345 |
| 2005/0050543 A1 | 3/2005 | Ogus et al. | |
| 2005/0267882 A1 | 12/2005 | Aupperlee et al. | |
| 2007/0038440 A1* | 2/2007 | Sung | G10L 19/22 704/218 |
| 2007/0061441 A1* | 3/2007 | Landis | G06F 9/45558 709/224 |
| 2007/0072299 A1* | 3/2007 | Orihashi | G01N 35/00 436/43 |
| 2007/0074084 A1* | 3/2007 | Mobin | G06F 13/4213 714/700 |
| 2007/0079028 A1* | 4/2007 | Hall | G05B 19/4186 710/62 |
| 2007/0198356 A1* | 8/2007 | LaCroix | G06Q 30/0275 705/14.49 |
| 2007/0268128 A1* | 11/2007 | Swanson | H04Q 9/00 340/539.22 |
| 2008/0143512 A1 | 6/2008 | Wakisaka et al. | |
| 2009/0070811 A1* | 3/2009 | Song | H04H 60/73 725/39 |
| 2009/0103593 A1* | 4/2009 | Bergamo | H04B 7/086 375/E1.002 |
| 2009/0198489 A1* | 8/2009 | Lee | G10L 19/093 704/205 |
| 2010/0303101 A1* | 12/2010 | Lazar | H03M 3/502 370/521 |
| 2011/0293026 A1* | 12/2011 | Bouzegzi | H04L 27/2676 375/260 |
| 2012/0133287 A1* | 5/2012 | Steiner | G01J 1/16 315/158 |
| 2012/0224858 A1 | 9/2012 | Chen et al. | |
| 2012/0271576 A1* | 10/2012 | Kamel | G05B 15/02 702/62 |
| 2012/0327829 A1 | 12/2012 | Sinha | |
| 2013/0003714 A1* | 1/2013 | Cannon | H04L 27/2338 370/345 |
| 2013/0275142 A1* | 10/2013 | Hatanaka | G10L 19/008 704/500 |
| 2014/0313862 A1* | 10/2014 | Rahimi | H04W 4/029 367/199 |
| 2014/0334796 A1* | 11/2014 | Galant | G11B 27/28 386/241 |
| 2016/0360594 A1 | 12/2016 | Chemel | |
| 2017/0026165 A1* | 1/2017 | Lyu | H04W 56/0035 |
| 2017/0078134 A1* | 3/2017 | Nossek | H04B 1/06 |
| 2017/0149900 A1 | 5/2017 | Moriguchi et al. | |
| 2017/0285623 A1 | 10/2017 | Figoli et al. | |
| 2018/0353106 A1 | 12/2018 | Han et al. | |
| 2021/0234926 A1* | 7/2021 | Pasquali | H04L 43/022 |

\* cited by examiner

PROCESSING SIGNALS FROM A SENSOR GROUP

CROSS-REFERENCE TO RELATED APPLICATIONS

This application is a continuation of U.S. patent application Ser. No. 15/357,717, filed Nov. 21, 2016, now issued as U.S. Pat. No. 10,887,395, which is incorporated by reference in its entirety.

BACKGROUND

1. Field

The present disclosure relates generally to collection and processing of output signals from sensors located across, for example, a wide geographical area.

2. Information

When it is desired to monitor conditions across an area, for example, a group of sensors may be employed at dispersed locations within the area, wherein output signals from sensors may be received at a centralized parameter collection facility. At a parameter collection facility, output signals from the group of sensors may be converted, such as from an analog format to digital format, for example, and transmitted across a network, such as the Internet, a local area network, or the like. In some instances, a parameter collection facility may make use of a mass storage device, such as a hard disk, for example, which may facilitate the storage of, for example, hundreds of megabytes of parameters corresponding to sensor output signals. However, use of mass storage devices, such as hard disks, for example, may be especially problematic in harsh outdoor environments subject to large daytime/nighttime temperature swings, changes in humidity, and so forth. In such instances, providing a low-cost mass storage based parameter collection system may be particularly challenging.

BRIEF DESCRIPTION OF DRAWINGS

Claimed subject matter is particularly pointed and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Figure 1:
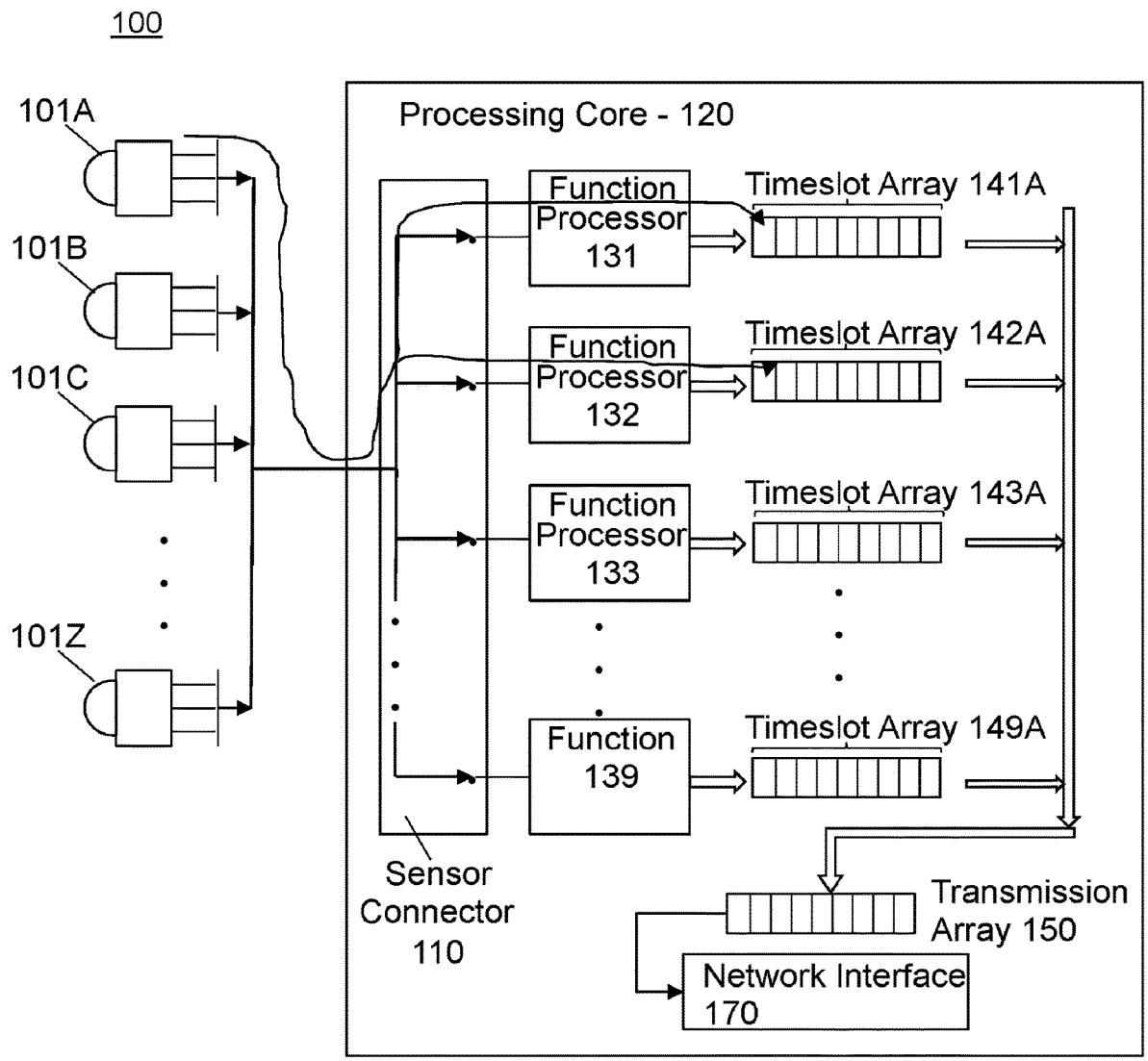
FIG. 1 is a schematic diagram of a sensor group coupled to a processing core according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems, and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes, and/or equivalents may occur to those skilled in the art. It is, therefore, to be understood that appended claims are intended to cover any and all modifications and/or changes as fall within claimed subject matter.

Reference throughout this specification to "one implementation," "an implementation," "one embodiment," "an embodiment" and/or the like may mean that a particular feature, structure, and/or characteristic described in connection with a particular implementation and/or embodiment may be included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described may be combined in various ways in one or more implementations. In general, of course, these and other issues may vary with context. Therefore, particular context of description and/or usage may provide helpful guidance regarding inferences to be drawn.

Operations and/or processing, such as in association with networks, such as communication networks, for example, may involve physical manipulations of physical quantities. Typically, although not necessarily, these quantities may take the form of signals and/or states, such as magnetic and/or electrical signals, for example, capable of, for example, being stored, transferred, combined, processed, compared, and/or otherwise manipulated. It has proven convenient, at times, principally for reasons of common usage, to refer to these signals as bits, data, values, elements, symbols, characters, terms, numbers, numerals, and/or the like. It should be understood, however, that all of these and/or similar terms are to be associated with appropriate physical quantities and are intended to merely be convenient labels.

In this context, the terms "coupled," "connected," and/or similar terms, may be used. It should be understood that these terms are not intended as synonyms. Rather, "connected" may be used to indicate that two or more elements and/or other components, for example, are in direct physical and/or electrical contact; while, "coupled" may mean that two or more components are in direct physical, including electrical contact; however, "coupled" may also mean that two or more components are not in direct contact, but may nonetheless co-operate and/or interact. The term "coupled" may also be understood to mean indirectly connected, for example, in an appropriate context.

The terms, "and," "or," "and/or," and/or similar terms, as used herein, may include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms may be used to describe any feature, structure, and/or characteristic in the singular and/or may be used to describe a plurality or some other combination of features, structures and/or characteristics. In this context, the term "between" and/or similar terms are understood to include "among" if appropriate for the particular usage.

The "Internet" refers to a decentralized global network of interoperable networks, including devices that are part of such interoperable networks. The Internet includes local area networks (LANs), wide area networks (WANs), wireless networks, and/or long-haul public networks that, for example, may allow signal packets to be communicated between LANs. The term world wide web (WWW) and/or similar terms may also be used to refer to the Internet. Signal packets, also referred to as signal packet transmissions, may be communicated between nodes of a network, where a node may comprise one or more network devices, for example. As an illustrative example, but without limitation, a node may comprise one or more sites employing a local network address. Likewise, a device, such as a network device, may be associated with that node. A signal packet may, for example, be communicated via a communication channel and/or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

A network communications protocol, may include, without limitation, HTTP, HTTPS, Websockets, MQTT, AMQP, DDS, COAP, and other protocols, which may refer to a set of signaling conventions for communications between and/or among devices in a network, typically network devices, but may include computing devices, as previously discussed. For example, devices that substantially comply with a protocol and/or that are substantially compatible with a protocol may be included in the set of signaling conventions for communications between and/or among devices in a network. In embodiments, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers. A network may be very large, such as comprising thousands of nodes, millions of nodes, billions of nodes, or more, as examples. Likewise, a sensor group may be large, such as comprising hundreds of sensors, millions of sensors, and so forth, virtually without limitation.

In conventional settings, which do not benefit embodiments of claimed subject matter, collection and storage of signal samples from remotely located sensors at a high rate of sampling prior to transmission of signal sample values across a communications channel (e.g., the Internet, a wireless LAN, etc.) can become cost prohibitive. In some instances, co-locating a computerized parameter collection device, which may include a mass-memory device, located proximate with a sensor group, for example, may involve virtually continuous write and delete operations, which may quickly bring about deterioration of the mass memory device. Consequently, a computerized parameter collection device may require frequent, time-consuming, and/or costly maintenance. In some instances, such as a parameter collection device located at a radio base station, on a mountaintop, or in a reservoir or lake, for example, maintenance of such devices may be particularly challenging. Thus, in such environments, a premium may be placed on equipment, and/or methods of operating equipment, that permit parameter collection at high rates, such as one or more samples per second, without utilizing mass memory devices. In embodiments, parameter collection equipment may operate to analyze and store a relatively small number of parameters prior to transmitting relevant parameters across a communications channel, such as the Internet, for example. Such devices may be particularly useful in environments in which connectivity to a network, such as the Internet, may be poor and/or intermittent, for example.

In particular embodiments of claimed subject matter, a "sensor network" or a "sensor group" may be used interchangeably to represent a plurality of sensors to perform a wide variety of measurement operations. In one possible example, a sensor network or sensor group may operate in a commercial farming environment, which may employ hundreds of sensors, thousands of sensors, tens of thousands of sensors, or an even greater number of sensors. In one possible embodiment, sensors may be dispersed over a large commercial farm to provide periodic and/or occasional measurements of soil moisture content, local relative humidity, and/or temperature, for example. Signal sample values from sensors may be transmitted to a parameter collection device, which may employ a processing core, for example, to format sensor measurements for transmission along an external communications channel.

A sensor may operate to convert physical measurements to an analog or digital signal, for example, according to a "reading type" of an individual sensor. In this context, a "reading type," which may be used interchangeably with a "sensor reading type," means a sensor to implement measurement of a particular type of physical quantity. For example, a sensor may implement a reading type to measure displacement, velocity, acceleration, vibrational frequency, or any other physical quantity related to translational and/or vibrational motion of an object. A sensor may implement a reading type to measure a chemical parameter such as salinity, pH, alkalinity, toxicity, or concentration, for example. A sensor may implement a reading type to measure moisture content, temperature, heat flux, or illumination, for example. A sensor may implement a reading type to measure electrical parameters, such as voltage, current, power factor, phase angle, capacitance, inductance, frequency, wavelength, distortion, or noise content, for example. It should be noted that claimed subject matter is intended to embrace sensor types to implement virtually any reading type, without limitation, that corresponds to a measurement of a physical quantity by a sensor in any type of parameter monitoring environment.

In embodiments, measurements from sensors may be converted from an analog format to a digital format, for example, and may be processed in accordance with one or more function processors. Accordingly, in this context a "function processor" as the term is used herein means a hardware-based, signal processing operation, which may bring about extraction of parameters from output signal traces transmitted by, or otherwise obtained from one or more sensors of a sensor network. Thus, for the example of a sensor network to implement a reading type corresponding to measurement of moisture content of soil at a location of a commercial farm, output signal traces of one or more soil moisture sensors may be processed, via a function processor, to obtain a maximum value over a given duration or "timeslot," such as a one-minute timeslot, a 90-second timeslot, a one-hour timeslot, a one-day timeslot, a one-week timeslot, or a timeslot of any other suitable and/or useful duration. In embodiments, such timeslots may be implemented utilizing an array, such as a two-dimensional array, of a volatile memory, for example. Alternatively, or in addition, a function processor may operate to obtain a minimum value of soil moisture over a given timeslot which, again, may comprise one minute, 90 seconds, one hour, one day, one week, for example. It should be noted that timeslots may comprise any time duration, such as one minute, one one-hour, or one week, as previously mentioned, or may comprise other time duration, such as a fraction of one second (e.g., $\frac{1}{100}$ of one second, $\frac{1}{10}$ of one second, $\frac{1}{3}$ of one second, and so forth.) Additionally, a timeslot may comprise any type of multi-second duration, such as two-second durations, three-second period, five-second durations, and so forth. Further, a timeslot may comprise several-minute durations, such as two-minute durations, four-minute durations, or any other desired, useful, and/or convenient duration, and claimed subject matter is intended to embrace timeslots comprising any duration.

In particular embodiments, during a particular timeslot, a function processor may perform a sampling operation to obtain one or more signal sample values. Accordingly, a "signal sampling interval" may be used interchangeably with a "sampling interval" to mean a duration between successive samples obtained during a particular timeslot. In embodiments, a timeslot duration and a sampling interval may be configured to be independent from one another. For example, as previously mentioned, a timeslot may comprise a one-minute duration, while a sampling interval may comprise a smaller period of time, such as 30 seconds, one second, one-half second, and so forth. Accordingly, in one possible example, if a function processor operates to determine a maximum signal sample value over a one-minute timeslot for a parameter sampled at half-second intervals, the function processor may select from among 120 signal sample values to extract a maximum signal sample value. In another possible example, a function processor operating to determine an average value over a five-minute timeslot for a parameter sampled at half-second intervals may process 600 signal sample values (e.g., 5.0 minute×60 seconds/ minute×2.0 samples/second) to extract an average signal sample value over computed over the five-minute timeslot.

In particular embodiments, a processing core, may operate to perform number of processing functions utilizing output signal traces from a variety of sensor reading types (e.g., sensors to implement measurement of humidity, temperature, voltage, and so forth). Responsive to processing, such as utilizing a processing core, parameters extracted from signal sample values may be transmitted or reported by way of an interface to an external communications channel, such as the Internet, a local area network, or the like. In one possible example, a humidity sensor, which may measure humidity using a one-minute sampling interval, may report a maximum humidity value over a one-hour timeslot. In embodiments, if connectivity to a high-quality external communications channel is available, signal sample values may be reported to the external communications channel on a near real-time basis.

However, responsive to a communications channel, such as the Internet, being momentarily or occasionally unavailable, a processing core may store results of function processing in a timeslot array, which may be maintained in a volatile memory. In embodiments, while a communications channel remains unavailable or inaccessible, a processor core may store parameters computed by one or more function processors corresponding to additional timeslots, such as one-hour timeslots, for example. Additionally, while a communications channel remains unavailable, a function processor may continue to sample output signals from sensors, such as humidity sensors, at one-minute sampling intervals, for example. In response to a communications channel being reestablished or otherwise made available, contents of a timeslot array may be rapidly transmitted through a communications channel. Responsive to such transmission, a timeslot array may be emptied, which may provide capacity for storage of parameters in timeslots processed at future times.

FIG. 1 is a schematic diagram of a plurality of sensors coupled to a processing core according to an embodiment 100. As previously described herein, a sensor group, such as sensors 101A, 101B, 101C, . . . , 101Z, as shown in FIG. 1, may comprise sensors to implement a reading type to measure any number of physical quantities. Accordingly, sensors 101A, 101B, 101C, . . . , 101Z may provide output signal traces responsive to measurement of physical quantities such as quantities related to translational and/or vibrational motion of an object (e.g., displacement, velocity, acceleration, vibrational frequency, and so forth), chemical properties of a substance (e.g., pH, salinity, temperature, water content and/or water vapor content, and so forth), illumination-related quantities (e.g., intensity, wavelength, and so forth), electrical parameters (e.g., voltage, current, power, power factor, phase angle, capacitance, inductance, signal strength, and so forth), and a variety of additional physical quantities virtually without limitation, and claimed subject matter is not limited in this respect.

Sensors 101A, 101B, 101C, . . . , 101Z may be coupled to processing core 120 utilizing sensor connector 110, which may operate to route output signal traces from sensors to function processors 131, 132, 133, . . . , 139. It should be noted that although processing core 120 refers to function processors 131-139, indicating that processing core 120 comprises nine function processors, particular embodiments may comprise a lesser number of function processors, such as four function processors, five function processors, and so forth, or may comprise a greater number of function processors, such as 15 function processors, 100 function processors, and so forth. It should be noted that claimed subject matter is intended to embrace use of any number of function processors, virtually without limitation.

In particular embodiments, function processors, such as function processors 131-139, may perform analysis to extract parameters from output signal traces from sensors 101A, 101B, 101C, . . . , 101Z, for example. Accordingly, in one possible example, function processor 131 may implement maximum-value processing in which signal sample values from one or more of sensors 101A, 101B, 101C, . . . , 101Z are sampled, such as at sub-second sampling intervals, for determination of a maximum value over a timeslot. In a possible embodiment, a function processor 131 may sample output signal traces from sensor 101A at 0.5-second intervals, and may extract a maximum value, computed during a one-minute duration, for storage into a timeslot of timeslot array 141A. Accordingly, in such an example, function processor 131 may operate to extract a maximum value from among 120 samples (2.0 samples/second times 60.0 seconds) for insertion into a timeslot of timeslot array 141A.

In embodiments, a timeslot array may be configured according to a desired transmission frequency. Thus, for example, in some instances it may be advantageous to transmit one or more parameters relatively infrequently, such as, for example, one-hour intervals, two-hour intervals, etc. Accordingly, a timeslot array may be configured so as to store signal sample values accumulated over commensurate intervals (e.g., one-hour intervals, two-hour intervals, etc.). In other instances, it may be advantageous to transmit one or more parameters more frequently, such as, for example, 30-second intervals, one-minute intervals, etc. Accordingly, a timeslot array may be configured so as to store signal sample values accumulated over shorter durations, such as 30-second intervals, one-minute intervals, just for examples. It should be noted, however, that claimed subject matter is intended to embrace timeslot arrays encompassing a wide variety of sampling intervals, virtually without limitation.

In particular embodiments, operating virtually simultaneously with processing of function processor 131, function processor 132 may also obtain output signal traces from, for example, sensor 101A. In one possible embodiment, a function processor 132 may implement an averaging function, which may comprise extracting an average signal sample value of an output signal trace from sensor 101A, for example. Accordingly, in one nonlimiting example, function processor 132 may utilize the same output signal trace utilized by function processor 131, but may extract an entirely different parameter for storage into a timeslot of timeslot array 142A. Thus, again, in a possible example, function processor 132 may process the identical (or nearly identical) signals sampled by function processor 131. However, rather than compute a maximum value, may compute an average value utilizing the 120 signal sample values corresponding to the output signal trace of sensor 101A. In embodiments, function processor 132 may operate to sample an output signal trace from sensor 101A at a rate other than a signal sample rate utilized by function processor 131, such as sampling at 0.25 second intervals, for example, and claimed subject matter is not limited in this respect Hence, it can be appreciated that function processors 131-139 may operate to extract a number of parameters utilizing output signal traces from sensor 101A for storage within timeslots of timeslot arrays 141A-149A. In embodiments, function processors 131, 132, 133, . . . , 139 may implement a wide variety of logical and/or mathematical functions utilizing output signal traces from sensors, such as obtaining a maximum, a minimum, or an average of signal sample values, for example, for storage within timeslots 141A, 142A, 143A, . . . , 149A. Other logical and/or mathematical functions implemented by function processors 131-139 may include computing a trend of signal sample values, computing a cumulative value of signal sample values, computing a derivative (e.g., first derivative, second derivative, and so forth) utilizing signal sample values, computing and integration of signal sample values (e.g., area under a curve of plotted signal sample values), computing a statistical variance of signal sample values, computing a median of signal sample values, or any combination thereof, and claimed subject matter is not limited in this respect.

In particular embodiments, network interface 170 may monitor connectivity with an external communications network, such as the Internet, an Ethernet, or any other suitable communications network, utilizing a wired connection or a wireless connection, or a combination thereof. In certain embodiments, responsive to network interface 170 indicating that a connection to an external communications network is present, or that a connection exists that meets or exceeds a threshold quality metric, parameters from timeslot arrays 141A-149A may be arranged into transmission array 150. In accordance with a TCP/IP protocol, for example, network interface 170 may periodically, or occasionally, transmit at least a portion of the contents of transmission array 150 to an external communications network. Responsive to transmission of at least a portion of transmission array 150, memory locations corresponding to timeslots of timeslot arrays 141A-149A may be reused.

In particular embodiments, if transmission array 150 has been populated with parameters from timeslot arrays 141A-149A, memory locations storing the parameters may be marked as "committed" to indicate that the timeslot may be reused. Accordingly, at least in some embodiments, criteria for reuse of a particular timeslot may be based, at least in part, on storage of a parameter extracted from a timeslot and inserted into a transmission array, rather than actual transmission of contents of the transmission array to an external communications network. Additionally, in particular embodiments, a transmission array may remain "uncommitted" to indicate its non-reusability, until the contents of the transmission array has been transmitted to an external communications network. It should be recognized, however, that in certain embodiments, a transmission array need not be completely filled in order for transmission along an external communications network to occur. Thus, in certain embodiments, transmission array 150 may represent a transactional unit to indicate to a harvesting algorithm, for example, which operates to assign parameters harvested from timeslot arrays 141A-149A, for example, that a new group of parameters may be assigned to transmission array 150.

Accordingly, if network interface 170 indicates that a connection exists with an external communications network, or a connection meeting or exceeding a threshold of a communications quality parameter, transmission array 150, after successful transmission to an external communications network, may be periodically or nearly continuously updated with timeslot parameters from one or more of timeslot arrays 141A-149A. Additionally, as contents of transmission array 150 is updated with parameters extracted from individual timeslots of timeslot arrays 141A-149A, individual timeslots of timeslot arrays 141A-149A may be reused to store parameters responsive to processing by function processors 131-139. Thus, it can be appreciated that as a consequence of frequent transmission of contents of transmission array 150 to an external communications network, timeslot arrays 141A-149A may consume only a small amount of volatile or nonvolatile memory. Accordingly, particular embodiments may operate in a manner that reduces a need to realize timeslot arrays 141A-149A implementing mass memory storage elements, such as memory storage elements greater than 50 MB, just to name a possible example.

On occasion, a connection to an external communications network may degrade to a level that does not permit reliable communications between processing core 120 and network elements external to processing core 120. On other occasions, communications with an external communications network may be lost entirely. Accordingly, in such instances, transmission array 150 may accumulate parameters which, upon restoration of a connection with an external communications network, may be transmitted to the external communications network. However, while communications with an external communications network is unavailable, function processors 131-139 may continue to insert parameters into timeslots of timeslot arrays 141A-149A. Thus, in a possible example, if timeslot array 141A comprises 100 timeslots, wherein each timeslot stores a maximum of signal sample values from a one-minute interval, timeslot array 141A may store up to 100 minutes of parameters responsive to processing by function processor 131. Additionally, while communications with an external communications network is unavailable, or does not exceed a quality threshold, a function processor 131 may continue to sample output signal traces from sensor 101A at a rate that is unaffected by the availability or quality of communications with an external communications network.

Thus, in particular embodiments, despite the occasional unavailability of communications with an external communications network, function processors 131-139 may continue to sample output signal traces from sensors 101A-101Z at a rate that is unaffected by availability of communications with network elements external to processing core 120. Additionally, responsive to restoration of communications with an external communications network, transmission array 150 may be populated with parameters from timeslot arrays 141A-149A. In embodiments, such population of transmission array 150 with parameters from timeslot arrays 141A-149A may operate to provide usable timeslots, which may be populated with parameters responsive to processing of output signal traces by function processors 131-139.

Thus, in particular embodiments, such as instances in which a high-quality high-capacity external communications network is available, and in which parameters are extracted from signal sample values on a relatively infrequent basis, a transmission array may be only partially filled prior to transmission of contents of the transmission array along the external communications network. In other instances, in which capacity of an external communications network is limited (e.g., low-quality and/or low-capacity) transmission arrays may be likely to be full prior to transmission of contents along the external communications network.

Figure 2:
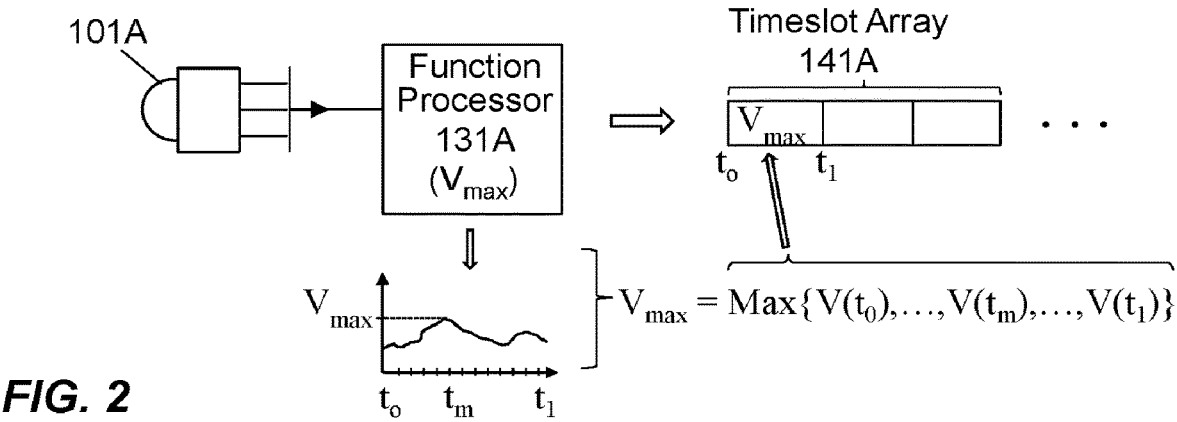
FIG. 2 is a schematic diagram of a sensor and a function processor according to an embodiment.

FIG. 2 is a schematic diagram of a sensor and a function processor according to an embodiment 200. Accordingly, as previously mentioned herein, in a possible example, function processor 131 operates to extract a maximum value from an output signal trace generated by sensor 101A over a particular duration of a timeslot. Accordingly, function processor 131A may store, such as by utilizing an internal memory array, maximum values of an output signal traces, such as voltage, just to name a possible example, for storage into timeslot array 141A. Function processor 131A may select and/or or extract a parameter representing a maximum voltage acquired over the timeslot $t_0$-$t_1$ according to the relation: $V_{max}=\text{Max}\{V(t_0), \ldots, V(t_m), \ldots, V(t_1)\}$, in which $V(t_m)$ represents a signal sampling interval during which the parameter $V_{max}$ is obtained.

Figure 3:
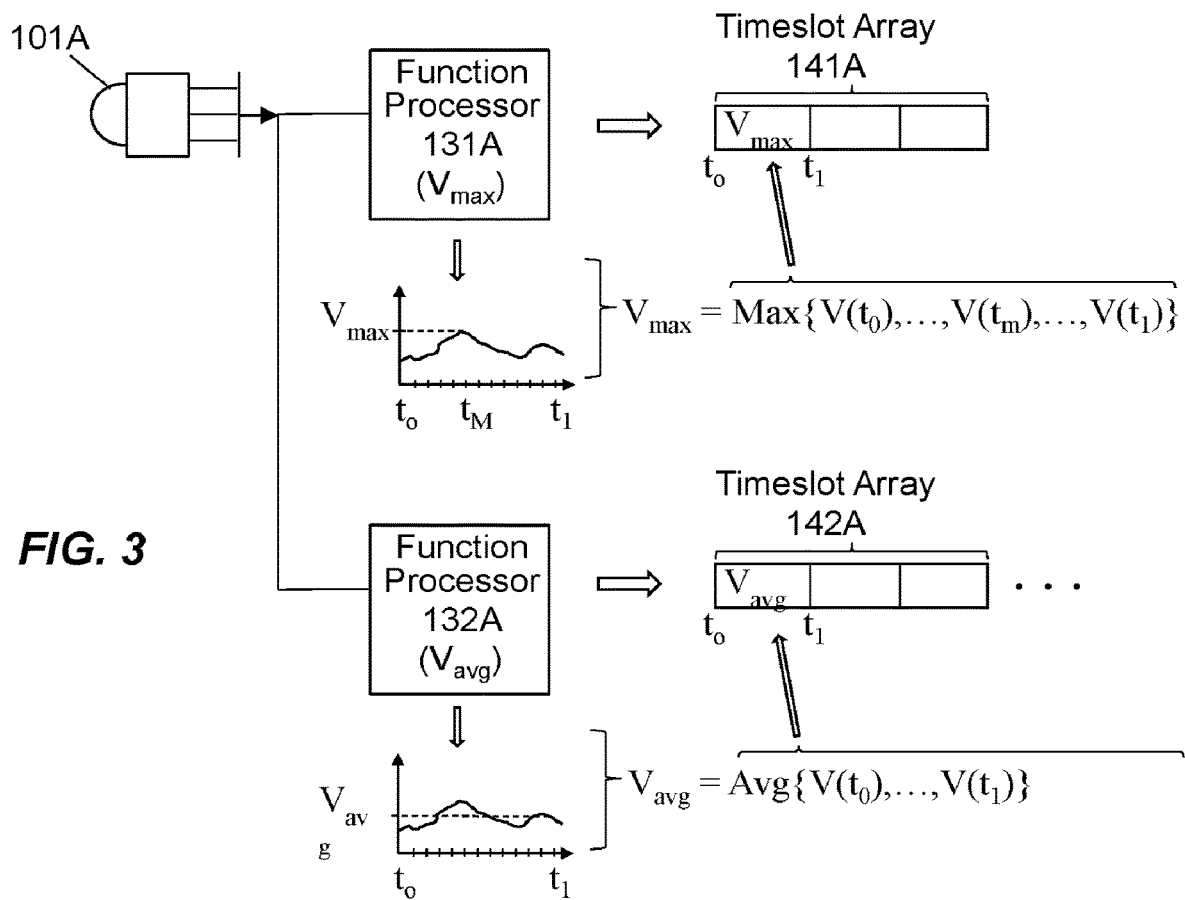
FIG. 3 is a schematic diagram of a sensor coupled to two function processors according to an embodiment.

FIG. 3 is a schematic diagram of a sensor coupled to two function processors according to an embodiment 300. In embodiment 300, sensor 101A, which may provide an output signal trace representing a measured voltage, may be conveyed to both function processor 131A and 132A. Accordingly, as shown in FIG. 3, an output signal trace from sensor 101A may be processed utilizing function processor 131A, which may determine a parameter representing a maximum voltage value achieved during the timeslot $t_0$-$t_1$. An output signal trace from sensor 101A may be additionally processed utilizing function processor 132A, which may extract or compute a parameter representing an average voltage acquired over the timeslot $t_0$-$t_1$ substantially in accordance with the relation: $V_{avg}=\{V(t_0), \ldots, V(t_1)\}$.

Figure 4:
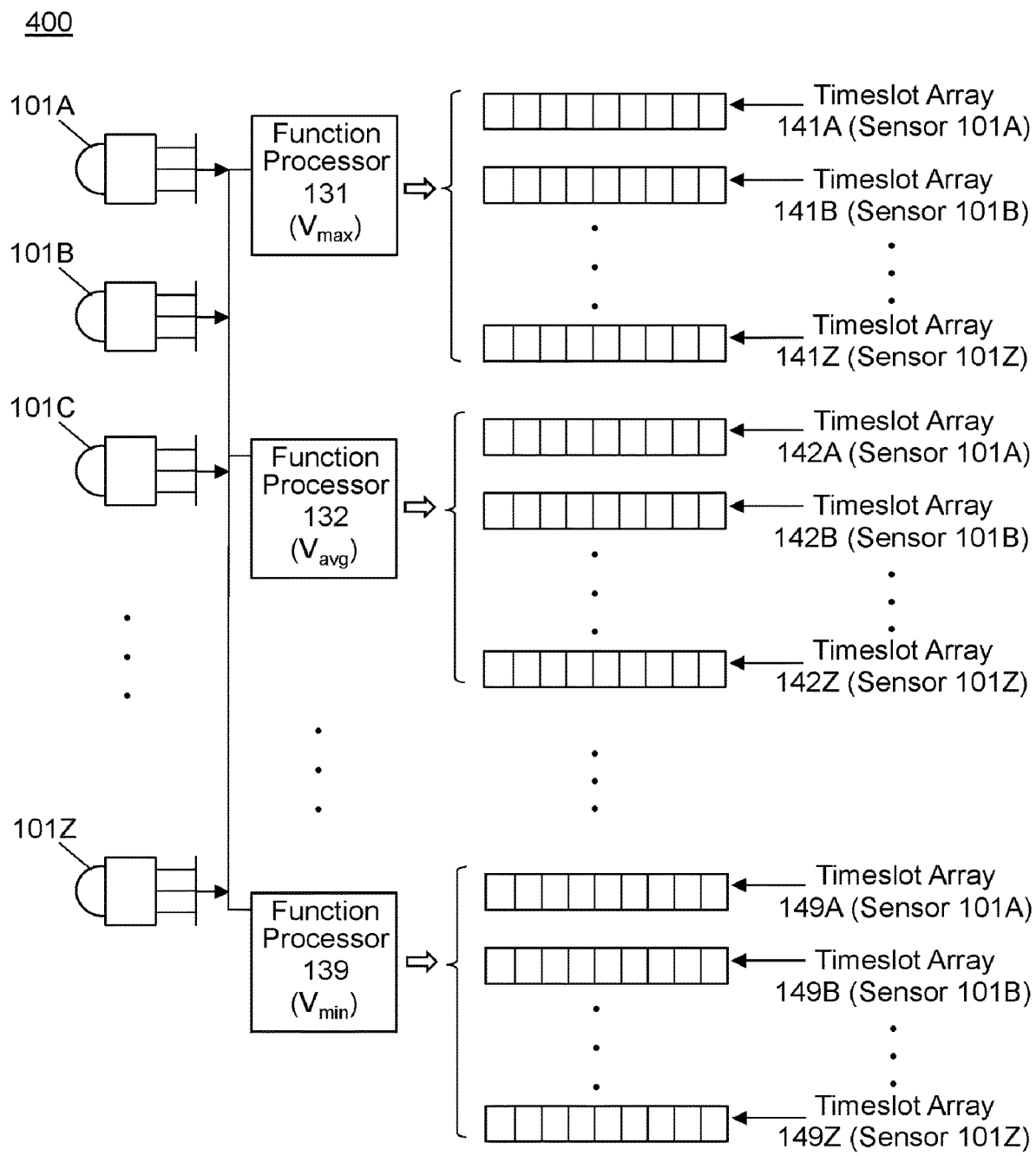
FIG. 4 is a schematic diagram of a sensor group, function processors, and timeslot arrays according to an embodiment.

FIG. 4 is a schematic diagram of a sensor group, function processors, and timeslot arrays according to an embodiment 400. As shown in FIG. 4, sensors 101A-101Z may represent sensors to provide, for example, an output signal trace corresponding to measurements of physical quantities, chemical parameters, and so forth. In the embodiment of FIG. 4, sensors 101A-101Z are coupled to function processors 131-139, which may perform function processing utilizing output signal traces at signal sampling intervals. Accordingly, in one possible example, function processor 131 may compute a maximum value of output signal traces from sensors 101A-101Z, for example. Thus, timeslot array 141A may be designated to store maximum values of an output signal trace from sensor 101A over a duration of one minute, for example. Likewise, timeslot array 141B may be designated to obtain and store maximum values of an output signal traces from sensor 101B over a duration of one minute, for example. In a similar manner, additional timeslot arrays, such as timeslot arrays 141C-141Z, for example, may be utilized to obtain and store maximum values from corresponding sensors, such as sensors 101C-101Z. Thus, as shown in FIG. 4, output signal traces from numerous sensors may be processed by function processor 131, and results of such function processing may be stored into a corresponding timeslot array. Additionally, although the above example describes timeslot arrays 141A-141Z as comprising a duration of one minute, for example, in other embodiments, timeslot arrays 141A-141Z may represent differently-configured durations. For example, in one possible embodiment, timeslot array 141A may store values analyzed over a duration of one minute, and timeslot array 141B may store values analyzed over a duration of two minutes, for example.

In the embodiment of FIG. 4, function processor 132 may obtain output signal traces from sensors 101A-101Z, which may bring about storage of results, such as an average value of signal samples of output signal traces obtained over a signal sampling interval. In a possible example, output signal traces to be averaged may be sampled at 0.5 second intervals over a one-minute duration. In a similar manner, function processor 139 may acquire output signal traces from sensors 101A-101Z, which may bring about storage of computed results, such as a minimum value of signal samples of output signal traces, to be stored into timeslots 149A, 149B, . . . , 149Z. It should be noted that although embodiments of claimed subject matter are intended to embrace any number of function processors, any number of sensors, and any number of timeslot arrays, virtually without limitation.

Figure 5:
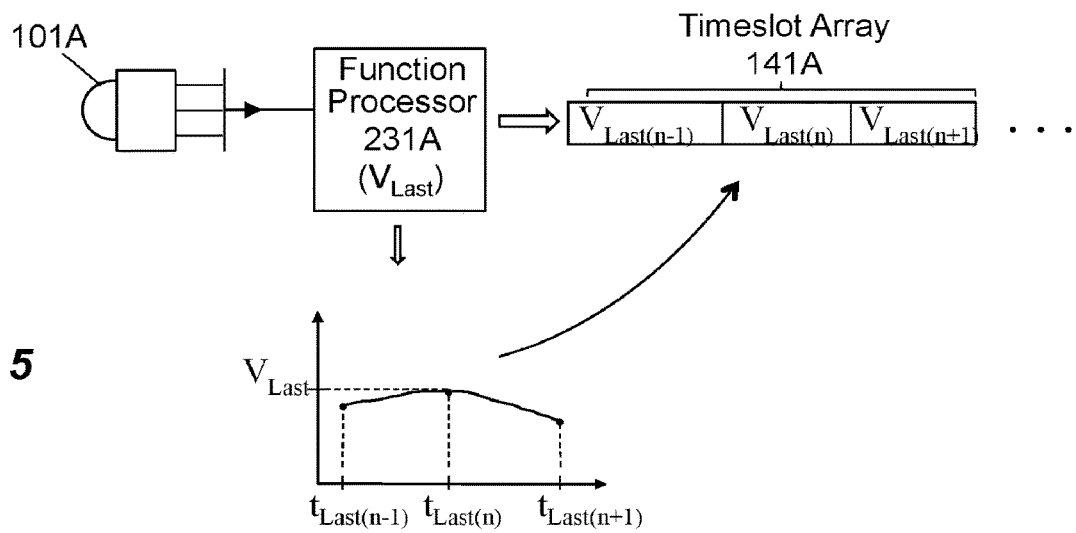
FIG. 5 is a schematic diagram of a sensor coupled to a "Last" function processor according to an embodiment.

FIG. 5 is a schematic diagram of a sensor coupled to a "Last" function processor according to embodiment 500. As previously mentioned herein, function processors, such as function processors 131-139, for example, may experience occasional unavailability of communications with an external communications network. However, responsive to reestablishment of high-quality communications with an external communications network, one or more function processors may be capable of virtually continuously updating a timeslot array with signal sample values from sensors, such as sensors 101A-101Z. Thus, in the example of FIG. 5, function processor 231A performs a "Last" function in which signal sample values at a plurality of sampling intervals, such as all sample intervals, for example, are stored in timeslot array 141A. Accordingly, for the example of FIG. 5, an output signal sample value from sensor 101A, such as $V_{Last(n-1)}$, which may be sampled at time $t_{Last(n-1)}$, may be made available to a transmission array, such as transmission array 150 of FIG. 1, for example, for immediate transmission to an external communications network utilizing, for example, network interface 170 also of FIG. 1. It should be noted that although FIG. 5 indicates shows only a single sensor, such as sensor 101A, coupled to function processor 231A, embodiments of claimed subject matter may include a plurality of sensors, such as sensors 101A-101Z of FIG. 1, for example, coupled to function processor 231A to permit storage of a "Last" signal sample value from some or all of sensors 101A-101Z.

Accordingly, in particular embodiments, if a connection to a high-quality external communications network is available, function processors of a processing core, such as processing core 120, for example, may operate to convey signal sample values from a plurality of sensors, such as sensors 101A-101Z, to an external communications network virtually in real time. In particular embodiments, such real-time or near-real-time signal sampling may permit processing core 120 to present unprocessed parameters (e.g., "raw data") to an external communications network. Further, if a connection to a high quality external communications network is interrupted, a processing core, such as processing core 120, for example, may return to a function processing operation, in which parameters computed by function processors, such as function processors 131-139 of FIG. 1, for example, are stored in a timeslot array, such as timeslot arrays 141-149 of FIG. 1.

Figure 6A:
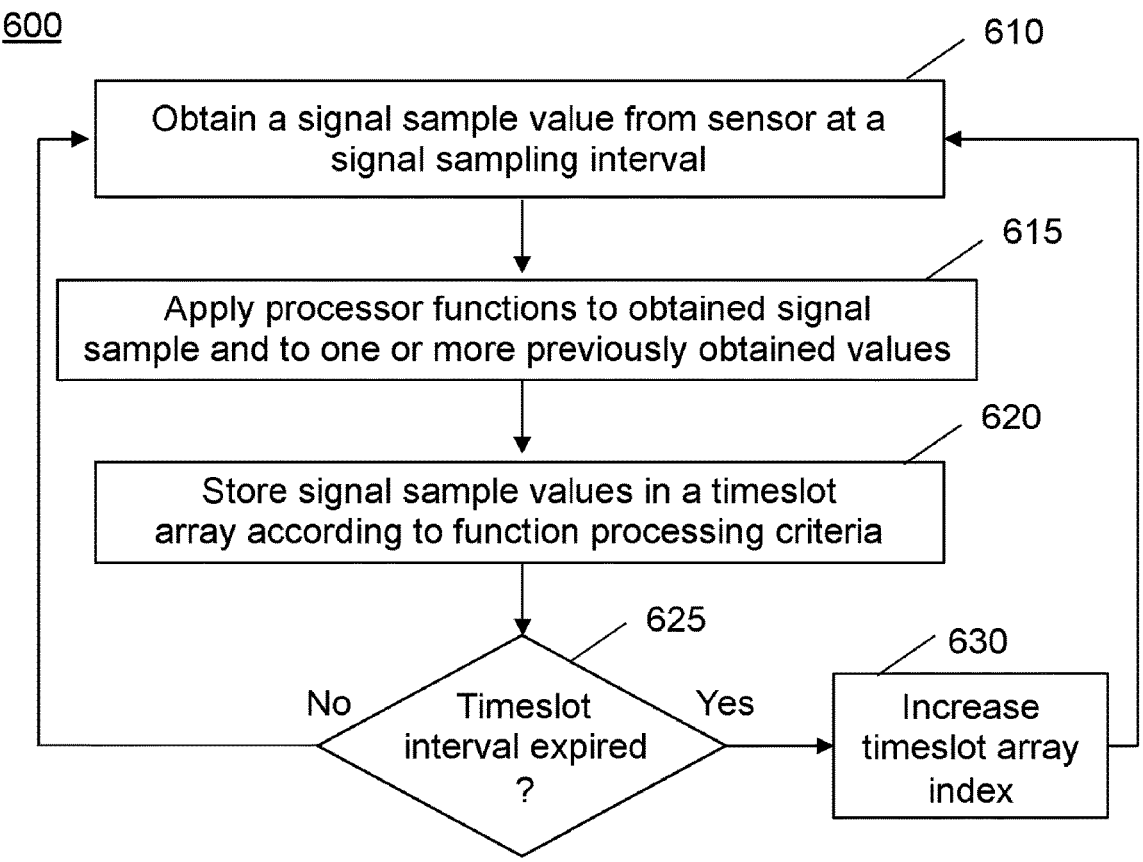
FIGS. 6A-6B are a flowchart for a method of parameter collection in an intermittently-connected Internet environment according to an embodiment.

FIG. 6A is a flowchart for a method of parameter collection in an intermittently-connected Internet environment according to an embodiment 600. Example implementations, such as described with respect to FIG. 6A-6B, may include blocks in addition to those shown and described, fewer blocks, or blocks occurring in an order different than may be identified, or any combination thereof. Although the sensors coupled to the processing core of FIG. 1 may be utilized to perform the method of FIG. 6A, the method may be performed by a variety of equipment, and claimed subject matter is not limited in this respect. The method of FIG. 6A may begin at block 610, which may comprise obtaining a signal sample values from a sensor at a signal sampling interval. In a particular embodiment, block 610 may occur at a sampling interval significantly smaller than a timeslot, such as a timeslot as previously described herein. In one possible embodiment, signal sample values may be obtained from a sensor, such as described at block 610, at a signal sampling interval of 0.5 seconds, during a timeslot of for example 1.0 minutes. Accordingly, in one nonlimiting example, if the signal sample value obtained at block 610 is to be directed to determining a maximum value of a sensor output trace, 120 signal sample values may be evaluated to determine an appropriate maximum value. However, claimed subject matter is intended to embrace obtaining signal sample values to bring about any type of function processing, such as determination of a maximum value, a minimum value, an average value, a trend of signal sample values, a summation of values, a derivative of a curve formed from discrete signal sample values, and so forth, virtually without limitation.

The method may continue at block 615, which may comprise applying processor functions to comparing one or more obtained signal sample values with one or more previously obtained signal sample values. In one possible example not intended to limit the scope of claimed subject matter, in which a maximum of signal sample values corresponding to a voltage over a timeslot extending from $t_0$-$t_1$ is to be determined, a most recently obtained value may be compared with a previously obtained value to determine which of the two obtained values represents a greater signal sample value. At block 620, a signal sample value, such as a maximum signal sample value may be stored in a timeslot array. Block 625 may comprise a decision block at which a determination is made as to whether a timeslot interval has expired. If the decision of block 625 indicates that a timeslot representing a particular duration (e.g., a one-minute timeslot, a 90-second timeslot, a one-our timeslot, etc.) has not expired, additional signal samples may be obtained, and the method may return to block 610. If, however, the decision of block 625 indicates that a timeslot duration has expired, a function processor, such as function processors 131-139, of FIG. 4 for example, may move to the next timeslot in a timeslot array, such as timeslot array 141A of FIG. 4, for example.

It should be noted, again, that although blocks 610-630 are described in the context of an approach toward obtaining a maximum signal sample value, blocks 610-630 may be adapted, configured, or modified to accommodate processing any type of signal sample values, and claimed subject matter is not limited in this respect. Additionally, it should be noted that block 610-630 may be performed for any number of sensors, which may number into the dozens, hundreds, thousands, virtually without limitation.

Figure 6B:
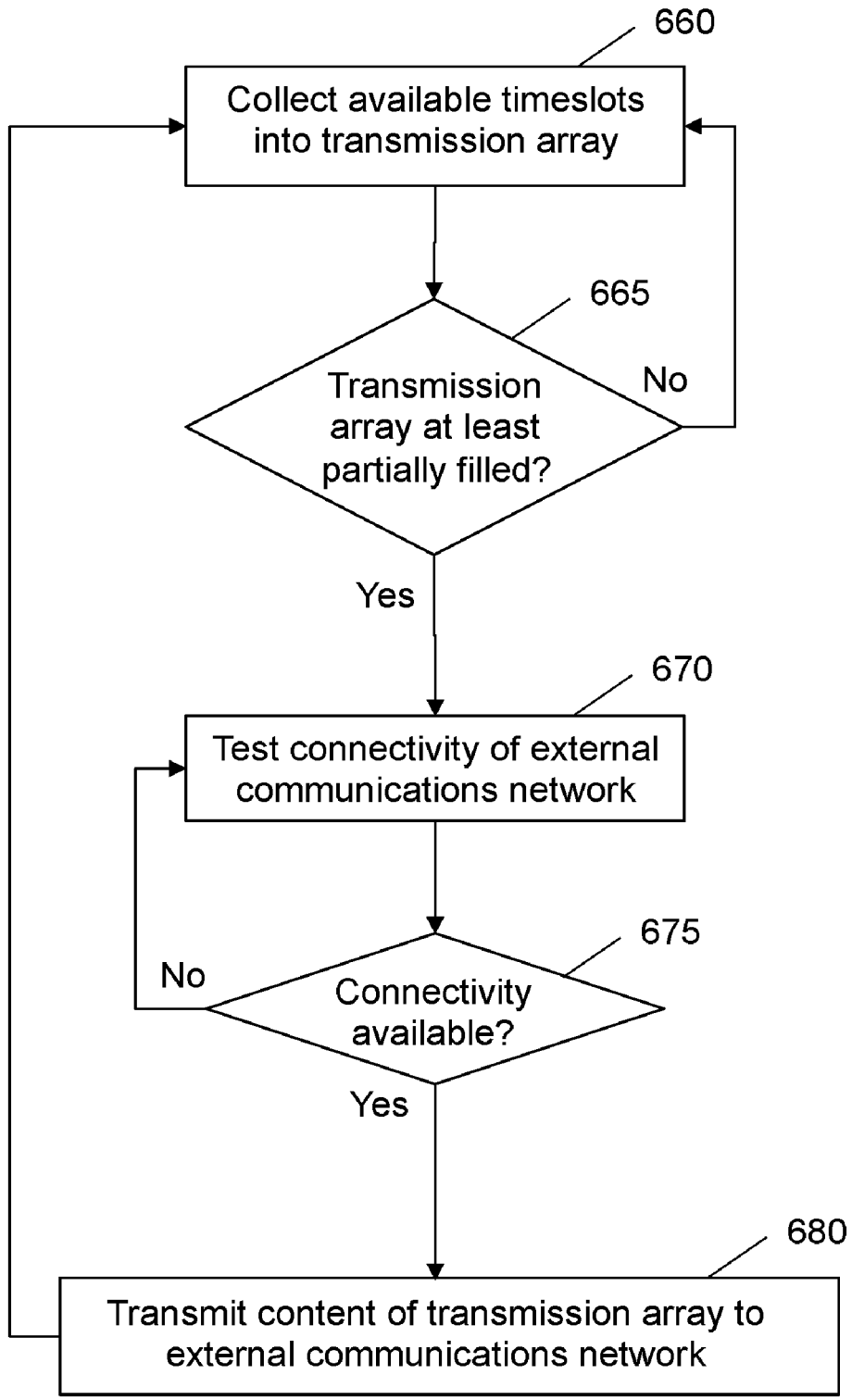

FIG. 6B is a flowchart for a method of parameter collection in an intermittently-connected Internet environment according to an embodiment 650. It should be noted that FIG. 6A and FIG. 6B represent two algorithms that are independent from one another, meaning that the frequencies at which the two algorithms are triggered can be configured independently. For example, the method of embodiment 650 may be triggered at a frequency different from a frequency at which embodiment 600 is triggered. The correspondence between embodiment 600 and embodiment 650 allows a strong decoupling between sensor sampling frequency and network transmission frequency.

At block 660, function processors of a processor core, such as processor core 120 of FIG. 1, for example, may operate to populate or fill timeslots of a timeslot array with outcomes of processing of one or more function processors, such as described with respect to FIG. 6A. Block 660 may additionally comprise collecting available timeslots, such as one or more portions timeslot arrays 141A-149Z of FIG. 4 into a transmission array, such as transmission array 150 of FIG. 1. Accordingly, block 660 may comprise storage of entire timeslot arrays, such as timeslot arrays that may store outcomes of particular function processors, or may comprise storage of portions of a plurality of timeslots, and claimed subject matter is not limited in this respect.

At block 665, a determination may be made as to whether a timeslot array has been at least partially filled. If a decision indicates that a transmission array, such as transmission array 150 of FIG. 1, is empty, the operation of block 660 may be performed further so as to populate a transmission array with one or more values extracted from a corresponding number of timeslots. If the decision of block 665 indicates that a transmission array has been at least partially filled, the method may proceed to block 670, in which a processor core, such as processor core 120 of FIG. 1, for example, may perform a connectivity test to determine if a high-quality connection to an external communications network is present. If the decision of block 675 indicates that a quality metric of the external communications network exceeds a threshold, contents of a transmission array (e.g., filled or partially-filled) may be transmitted through the external communications network. In embodiments, a quality metric may relate to a speed at which parameters may be uploaded to the external communications network, a speed at which parameters may be downloaded from the communications network, a packet loss rate, and/or a measure of packet latency, just to name a few performance metrics, and claimed subject matter is not limited in this respect.

As described above, in particular embodiments, a transmission array need not be completely filled with parameters from a timeslot array in order for contents of the transmission array to be transmitted to an external communications network. Accordingly, if a high-quality connection to an external communications network is present, parameters extracted from a timeslot array may be transmitted to the external communications network virtually immediately after storage in the transmission array.

If the decision of block 675 indicates that a high-quality connection to an external communications network is not present, block 670 may be performed a second time, perhaps after a suitable period of time has elapsed (e.g., 100 milliseconds, ½ second, one second, 30.0 seconds, or other appropriate duration) connectivity to an external communications network may be rechecked. Accordingly, blocks 670-675 may represent a loop, in which connectivity to an external communications network may be checked and rechecked until such time as connectivity to the external communications network is restored. If connectivity to an external communications network has been restored, block 680 may be performed, which may comprise transmitting of contents of the transmission array through the external communications network. Responsive to transmission of signal sample values stored in the transmission array, block 660 may be performed, which may comprise function processors of a processor core collecting available timeslots, such as one or more portions of timeslots 141A-149Z of FIG. 4.

In particular embodiments, block 680 may also represent a loop in which portions of the contents of the transmission array are arranged into a message structure, such as for transmission over the Internet, for example. After a first portion of the contents of the transmission array are transmitted, a second portion may be arranged into a message structure for transmission, and transmitted, which may be followed by additional portions of a transmission array until the entire contents of the transmission array has been conveyed to an external communications network.

In particular embodiments, if connectivity to an external communications network is available for greater than threshold time periods, such as time periods greater than 10.0 minutes, 15.0 minutes, 30.0 minutes, just to name a few nonlimiting examples, a function processor performing the "Last" function as described with respect to FIG. 5 may be particularly advantageous. In certain embodiments, if connectivity is relatively reliable, a "Last" function processor may permit signal sample values to be conveyed to an external communications network virtually in real time. In particular embodiments, if connectivity is relatively reliable, operation of one or more function processors, such as function processors 131-139, for example, may be paused in favor of a function processor executing a "Last" function, which may permit function processing of signal sample values external to a processing core, such as processing core 120.

Figure 7:
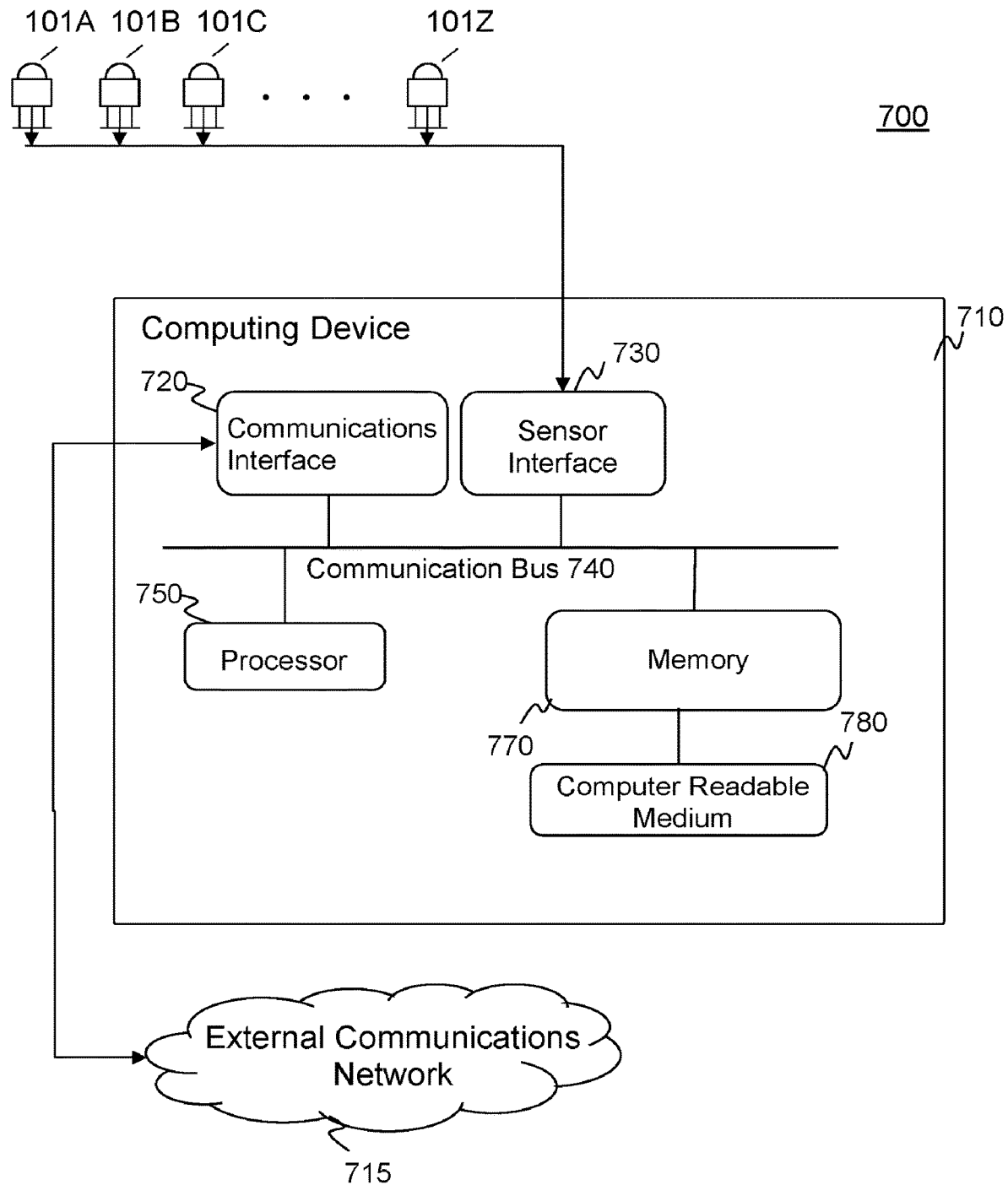
FIG. 7 is a schematic diagram of a processor, which might be employed to collect parameters from sensors in an intermittently-connected Internet environment.

For purposes of illustration, FIG. 7 is a schematic diagram 700 of a computing apparatus that may be employed for extracting parameters from sensor output signal traces according to an embodiment. A computing apparatus, such as that embodied in FIG. 7 may comprise computing device 710 that may be employed to perform operations such as, for example, described herein. Computing device 710 may interface with external communications network 715 which may comprise features of a cellular communication network, an Ethernet, or any other wired or wireless communications network, such as the Internet, utilizing any number of protocols such as HTTP, HTTPS, Websockets, MQTT, AMQP, DDS, COAP, and so forth, and claimed subject matter is not limited in this respect.

Communications interface 720, processor 750, and memory 770, may communicate by way of communication bus 740, for example. In FIG. 7, computing device 710 may store various forms of computer-implementable instructions, by way of sensor interface 730, for example, to obtain output signal traces from sensors 101A-101Z. Although a computing device, such as the computing device embodied in FIG. 7 shows the above-identified components, claimed subject matter is not limited to computing device having only these components as other implementations may include alternative arrangements that may comprise additional components, fewer components, or components that function differently while achieving similar results. Rather, examples are provided merely as illustrations. It is not intended that claimed subject matter be limited in scope to illustrative examples.

Processor 750 may be representative of one or more circuits, such as digital circuits, to perform at least a portion of a computing procedure and/or process. By way of example but not limitation, processor 750 may comprise one or more processors, such as controllers, microprocessors, microcontrollers, application specific integrated circuits, digital signal processors, programmable logic devices, field programmable gate arrays, and the like, or any combination thereof. In implementations, processor 750 may perform signal processing to manipulate signals and/or states and/or to construct signals and/or states, for example.

Memory 770 may be representative of any memory storage technology. Memory 770 may comprise, for example, random access memory, read only memory, or one or more data storage devices and/or systems, such as, for example, a solid-state memory drive, flash memory, just to name a few examples. It should be noted that, at least in particular embodiments, mass memory is may be utilized only for storage of executable processing instructions (read-only), while the actual processing of signal sample values occurs in memory. This is to say that at least certain embodiments of claimed subject matter mass do not utilize mass memory and memory 770 may be utilized to store a program, as an example. Memory 770 may also comprise a memory controller for accessing computer-readable medium 780, which may process output signal traces for storage into one or more timeslot arrays. Under direction of processor 750, memory, such as cells storing physical states, representing, for example, a program, may be executed by processor 750 and generated signals may be transmitted via the Internet, for example. Processor 750 may also receive digitally encoded signals from computing device 710. External communications network 715 may comprise one or more communication links, processes, and/or resources to support exchanging communication signals between a client computing device and server, which may, for example, comprise one or more servers (not shown).

Thus, in embodiments, a method and apparatus may be implemented to decouple the frequency of collection of signal sample values from a sensor group from the frequency of transmission of parameters across an external communications network. To bring about these features, a highly efficient use of in-memory resources utilizing a timeslots approach reduces a need for mass memory, such as memories exceeding, 50 Mb, for example.

The term "processing core," as used herein, refers to a system and/or a device, such as a computing device, that includes a capability to process and/or store data in the form of signals and/or states. Thus, a computing device, in this context, may comprise hardware, software, firmware, or any combination thereof (other than software per se). Computing device 710, as depicted in FIG. 7, is merely one such example, and claimed subject matter is not limited to this particular example. For one or more embodiments, a computing device may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing device.

Memory 770 may store cookies relating to one or more users and may also comprise a computer-readable medium that may carry and/or make accessible content, code and/or instructions, for example, executable by processor 750 or some other controller or processor capable of executing instructions, for example. A user may make use of an input device and/or an output device, such as a computer mouse, stylus, track ball, keyboard, and/or any other device capable of receiving an input from a user.

Regarding aspects related to a communications and/or computing network, an external communications network may couple to sensors of a sensor group by way of a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, and/or other technologies, or the like. Network access technologies may enable wide area coverage for devices, such as client devices with varying degrees of mobility, for example.

A network may enable radio frequency and/or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known and/or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device and/or may otherwise be its primary user, for example. A computing device may be assigned an address by a wireless telephony network operator, a wired telephony network operator, and/or an Internet Service Provider (ISP). For example, an address may comprise a domestic and/or international telephone number, an Internet Protocol (IP) address, and/or one or more other identifiers. In other embodiments, a communication network may be embodied as a wired network, wireless network, or combination thereof.

A computing and/or network device may vary in terms of capabilities and/or features. Claimed subject matter is intended to cover a wide range of potential variations. For example, a network device may include a numeric keypad and/or other display of limited functionality, such as a monochrome liquid crystal display (LCD) for displaying text. In contrast, however, as another example, a web-enabled computing device may include a physical and/or a virtual keyboard, mass storage, and/or a display with a higher degree of functionality, such as a touch-sensitive color 2D or 3D display, for example.

A computing device may include and/or may execute a variety of now known, and/or to be developed operating systems, or derivatives and/or versions, including personal computer operating systems, such as a Windows, iOS or Linux, or a mobile operating system, such as iOS, Android, or Windows Mobile, or the like. A computing device may include and/or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A computing device may also include and/or execute a software application to communicate content, such as, for example, textual content, multimedia content, or the like. A computing device may also include and/or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features and/or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with and/or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, and/or another existing protocol, and/or another protocol that may be developed.

A network, such as an external communications network, may be compatible with now known, and/or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms, and/or symbolic representations of operations on binary signals and/or states, such as stored within a memory of a specific apparatus or special purpose computing device or a computing platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these and/or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

We claim:

1. A system comprising:
   a sensor network configured to obtain one or more output signal traces transmitted from a plurality of remotely located sensors; and
   a parameter-collection device comprising one or more processors configured to perform operations comprising:

sampling, at a configurable signal sampling interval, a plurality of signal sample values via the one or more output signal traces from the plurality of remotely located sensors, wherein the plurality of signal sample values correspond to a plurality of physical quantities measured by the plurality of remotely located sensors, wherein at least one of the one or more output signal traces is concurrently sampled at different signal sampling intervals;

computing, based at least in part on the plurality of signal sample values, a plurality of parameters, wherein the plurality of parameters are associated with one or more of the plurality of physical quantities measured by the plurality of remotely located sensors;

collecting the plurality of parameters in a first timeslot array and in a second timeslot array;

extracting, from among the plurality of parameters collected in the first timeslot array and in the second timeslot array, a portion of the plurality of parameters for transmission,
wherein the extracting is performed independently of the sampling,
by automatically selecting or calculating specific parameters based on the plurality of parameters collected, to assign the specific parameters to a transmission array, wherein the automatically selecting or calculating the specific parameters comprises processing one or more functions to determine a minimum value, a maximum value, a cumulative value, a trend, a change from a reference value, a last value, a change from one or more previously recorded values, an average value, a standard deviation from the average value, a derivative, or a combination thereof;

storing, in the transmission array, the portion of the plurality of parameters extracted from the first timeslot array and from the second timeslot array; and transmitting, to an external communications network, the portion of the plurality of parameters stored in the transmission array, at a transmission interval, wherein the transmission interval is independent of whether any timeslot durations of the first timeslot array and the second timeslot array have expired, and wherein the transmitting operation is performed independently of the storing operation of the portion of the plurality of parameters.

2. The system of claim 1, wherein the plurality of signal sample values comprises a first signal sample value and a second signal sample value, and wherein the operations further comprise:
evaluating, via one or more function processors, at least the first signal sample value and the second signal sample value.

3. The system of claim 2, wherein the second signal sample value is a most recently obtained sampled value sampled via the one or more output signal traces from the plurality of remotely located sensors.

4. The system of claim 1, the operations further comprising:
determining that a timeslot duration has expired for at least one of the first timeslot array or the second timeslot array, in which are stored the portion of the plurality of parameters, comprising a first parameter and a second parameter of the plurality of parameters; and in response to the determining that the timeslot duration has expired, evaluating a result of the one or more functions processed, with respect to the first parameter and the second parameter, with respect to the at least one of the first timeslot array or the second timeslot array, for the timeslot duration that has expired.

5. The system of claim 4, wherein the portion of the plurality of parameters stored in the transmission array comprises the result, wherein the result is different from the first parameter and is different from the second parameter.

6. The system of claim 1, the operations further comprising:
determining that a timeslot duration has expired for at least one of the first timeslot array or the second timeslot array, in which are stored a first signal sample value and a second signal sample value of the plurality of signal sample values; and in response to the determining that the timeslot duration has expired, determining, as a result of at least one function, that the second signal sample value is a representative value corresponding to the at least one of the first timeslot array or the second timeslot array, for the timeslot duration that has expired.

7. The system of claim 6, wherein the portion of the plurality of parameters stored in the transmission array comprises the second signal sample value, excluding the first signal sample value.

8. A parameter-collection device, comprising one or more processors configured to perform operations comprising:
sampling, at a configurable signal sampling interval, a plurality of signal sample values via one or more output signal traces from a plurality of remotely located sensors, wherein the plurality of signal sample values correspond to a plurality of physical quantities measured by the plurality of remotely located sensors, wherein at least one of the one or more output signal traces is concurrently sampled at different signal sampling intervals;

computing, based at least in part on the plurality of signal sample values, a plurality of parameters, wherein the plurality of parameters are associated with one or more of the plurality of physical quantities measured by the plurality of remotely located sensors;

collecting the plurality of parameters in a first timeslot array and in a second timeslot array;

extracting, from among the plurality of parameters collected in the first timeslot array and in the second timeslot array, a portion of the plurality of parameters for transmission, wherein the extracting is performed independently of the sampling, by automatically selecting or calculating specific parameters based on the plurality of parameters collected, to assign the specific parameters to a transmission array, wherein the automatically selecting or calculating the specific parameters comprises processing one or more functions to determine a minimum value, a maximum value, a cumulative value, a trend, a change from a reference value, a last value, a change from one or more previously recorded values, an average value, a standard deviation from the average value, a derivative, or a combination thereof;

storing, in the transmission array, the portion of the plurality of parameters extracted from the first timeslot array and from the second timeslot array; and transmitting, to an external communications network, the portion of the plurality of parameters stored in the transmission array, at a transmission interval, wherein the transmission interval is independent of whether any timeslot durations of the first timeslot array and the second timeslot array have expired, and wherein the transmitting operation is performed independently of the storing operation of the portion of the plurality of parameters.

9. The parameter-collection device of claim 8, wherein the plurality of signal sample values comprises a first signal sample value and a second signal sample value, and wherein the operations further comprise:
evaluating, via one or more function processors, at least the first signal sample value and the second signal sample value.

10. The parameter-collection device of claim 9, wherein the second signal sample value is a most recently obtained sampled value sampled via the one or more output signal traces from the plurality of remotely located sensors.

11. The parameter-collection device of claim 8, the operations further comprising:
determining that a timeslot duration has expired for at least one of the first timeslot array or the second timeslot array, in which are stored the portion of the plurality of parameters, comprising a first parameter and a second parameter of the plurality of parameters; and
in response to the determining that the timeslot duration has expired, evaluating a result of the one or more functions processed, with respect to the first parameter and the second parameter, with respect to the at least one of the first timeslot array or the second timeslot array, for the timeslot duration that has expired.

12. The parameter-collection device of claim 11, wherein the portion of the plurality of parameters stored in the transmission array comprises the result, wherein the result is different from the first parameter and is different from the second parameter.

13. The parameter-collection device of claim 8, the operations further comprising:
determining that a timeslot duration has expired for at least one of the first timeslot array or the second timeslot array, in which are stored a first signal sample value and a second signal sample value of the plurality of signal sample values; and
in response to the determining that the timeslot duration has expired, determining, as a result of at least one function, that the second signal sample value is a representative value corresponding to the at least one of the first timeslot array or the second timeslot array, for the timeslot duration that has expired.

14. The parameter-collection device of claim 13, wherein the portion of the plurality of parameters stored in the transmission array comprises the second signal sample value, excluding the first signal sample value.

15. A non-transitory computer-readable storage medium having instructions stored thereon, wherein the instructions, when executed by at least one computer processor, cause the at least one computer processor to perform operations comprising:
sampling, at a configurable signal sampling interval, a plurality of signal sample values via one or more output signal traces from a plurality of remotely located sensors, wherein the plurality of signal sample values correspond to a plurality of physical quantities measured by the plurality of remotely located sensors, wherein at least one of the one or more output signal traces is concurrently sampled at different signal sampling intervals;
computing, based at least in part on the plurality of signal sample values, a plurality of parameters, wherein the plurality of parameters are associated with one or more of the plurality of physical quantities measured by the plurality of remotely located sensors;
collecting the plurality of parameters in a first timeslot array and in a second timeslot array;
extracting, from among the plurality of parameters collected in the first timeslot array and in the second timeslot array, a portion of the plurality of parameters for transmission, wherein the extracting is performed independently of the sampling, by automatically selecting or calculating specific parameters based on the plurality of parameters collected, to assign the specific parameters to a transmission array, wherein the automatically selecting or calculating the specific parameters comprises processing one or more functions to determine a minimum value, a maximum value, a cumulative value, a trend, a change from a reference value, a last value, a change from one or more previously recorded values, an average value, a standard deviation from the average value, or a derivative, or a combination thereof;
storing, in the transmission array, the portion of the plurality of parameters extracted from the first timeslot array and from the second timeslot array; and
transmitting, to an external communications network, the portion of the plurality of parameters stored in the transmission array, at a transmission interval, wherein the transmission interval is independent of timeslot durations of the first timeslot array and the second timeslot array, and wherein the transmitting operation is performed independently of the storing operation of the portion of the plurality of parameters.

16. The non-transitory computer-readable storage medium of claim 15, wherein the plurality of signal sample values comprises a first signal sample value and a second signal sample value, and wherein the operations further comprise:
evaluating, via one or more function processors, at least the first signal sample value and the second signal sample value, wherein the second signal sample value is a most recently obtained sampled value sampled via the one or more output signal traces from the plurality of remotely located sensors.

17. The non-transitory computer-readable storage medium of claim 15, the operations further comprising:
determining that a timeslot duration has expired for at least one of the first timeslot array or the second timeslot array, in which are stored the portion of the plurality of parameters, comprising a first parameter and a second parameter of the plurality of parameters; and
in response to the determining that the timeslot duration has expired, evaluating a result of the one or more functions processed, with respect to the first parameter and the second parameter, with respect to the at least one of the first timeslot array or the second timeslot array, for the timeslot duration that has expired.

18. The non-transitory computer-readable storage medium of claim 17, wherein the portion of the plurality of parameters stored in the transmission array comprises the result, wherein the result is different from the first parameter and is different from the second parameter.

19. The non-transitory computer-readable storage medium of claim 15, the operations further comprising:
- determining that a timeslot duration has expired for at least one of the first timeslot array or the second timeslot array, in which are stored a first signal sample value and a second signal sample value of the plurality of signal sample values; and
- in response to the determining that the timeslot duration has expired, determining, as a result of at least one function, that the second signal sample value is a representative value corresponding to the at least one of the first timeslot array or the second timeslot array, for the timeslot duration that has expired.

20. The non-transitory computer-readable storage medium of claim 19, wherein the portion of the plurality of parameters stored in the transmission array comprises the second signal sample value, excluding the first signal sample value.

\* \* \* \* \*